US007978580B1

(12) United States Patent
Kivits et al.

(10) Patent No.: US 7,978,580 B1
(45) Date of Patent: Jul. 12, 2011

(54) CALIBRATING OPTICAL DRIVE WRITE PARAMETERS DURING WRITING

(75) Inventors: Peter Kivits, Wallre (NL); Jents Temmerman, Hove (BE)

(73) Assignee: Marvell International Ltd., Hamilton (BM)

(*) Notice: Subject to any disclaimer, the term of this patent is extended or adjusted under 35 U.S.C. 154(b) by 565 days.

(21) Appl. No.: 12/104,261

(22) Filed: Apr. 16, 2008

Related U.S. Application Data

(60) Provisional application No. 60/912,351, filed on Apr. 17, 2007.

(51) Int. Cl.
*G11B 27/36* (2006.01)
(52) U.S. Cl. .......... 369/53.37; 369/44.29; 369/47.53; 369/53.28; 369/53.31; 369/53.34
(58) Field of Classification Search .......... 369/44.29, 369/47.53, 53.28, 53.31, 53.34, 53.37
See application file for complete search history.

(56) References Cited

U.S. PATENT DOCUMENTS

| | | | |
|---|---|---|---|
| 5,574,706 A | 11/1996 | Verboom et al. | |
| 7,436,745 B2 * | 10/2008 | Kim | 369/47.53 |
| 7,570,549 B2 * | 8/2009 | Van Endert et al. | 369/44.27 |
| 7,623,420 B2 | 11/2009 | Bahng | |
| 7,639,577 B2 | 12/2009 | Roh | |
| 2005/0068871 A1 * | 3/2005 | Weirauch | 369/47.53 |
| 2007/0030783 A1 * | 2/2007 | Van Endert et al. | 369/53.37 |
| 2007/0171805 A1 | 7/2007 | Shigeta et al. | |
| 2008/0106985 A1 * | 5/2008 | Hasebe et al. | 369/47.5 |
| 2008/0192598 A1 | 8/2008 | Jayaraman et al. | |
| 2008/0205210 A1 * | 8/2008 | Van Endert et al. | 369/44.27 |
| 2009/0122680 A1 * | 5/2009 | Van Endert et al. | 369/53.44 |
| 2009/0262616 A1 | 10/2009 | Tang et al. | |

OTHER PUBLICATIONS

"Write-Recalibration In Single- and Dual-Headed Optical Disk Drives", IBM Tech. Disclosure Bulletin, vol. 34, No. 9, Feb. 1992, Armonk, NY, pp. 70-71.*
"Taguchi Design Tutorial", Design-Ease 6 User's Guide, http://www.statease.com/e6ug/DE05-Taguchi.pdf, Rev. Jan. 10, 2001, pp. 5-1 to 5-9.*
"Running Optimum Power Control: Data Integrity in CD-Recording", Optical Storage Technology Association, Jan. 7, 1998.
"Taguchi Approach to Design of Experiments", American Society for Quality (ASQ), Sep. 24, 2007.
"Data Interchange on 120mm and 80mm Optical Disk using +R Format-Capacity: 4, 7 and 1, 46 Gbytes per Side", Standard ECMA-349, 3rd Edition, Dec. 2005.
"Write Strategies for high performance DVD+R/RW", Phillips, pp. 1-5, Oct. 29, 2004.

* cited by examiner

*Primary Examiner* — Wayne R Young
*Assistant Examiner* — Brenda Bernardi

(57) ABSTRACT

A model is derived for write parameters of a laser in an optical drive. A parameter range for the write parameters is set based on a recordable medium. A number of test runs are recorded on the recordable medium while varying the write parameters. Write performance characteristics are measured over the test runs, and a model of write performance as a function of the write parameters is derived. Values for write parameters are selected for use in writing actual data based on the derived model. A first section of user data is written to the data-carrying region of the recordable medium using the selected values. The write performance characteristics of the first section of user data are measured, and the model is updated by including the measurements from the data-carrying region. New values for the write parameters of the laser are selected based on the updated model.

34 Claims, 6 Drawing Sheets

CALIBRATING OPTICAL DRIVE WRITE PARAMETERS DURING WRITING

CROSS-REFERENCE TO RELATED APPLICATION

This application claims the benefit of U.S. Provisional Patent Application No. 60/912,351, filed Apr. 17, 2007, the contents of which are hereby incorporated by reference as if fully stated herein.

FIELD

The present disclosure generally concerns adjustment of optical drive write parameters for a recordable medium— e.g., a CD or DVD.

BACKGROUND

Optical drives are commonly used to write data to the surface of a recordable medium (e.g., a CD or DVD). In this field, however, optical drive writing performance often varies due to factors such as manufacturing differences between optical drives, differences between recordable media types or brands, and differences between disc speeds, along with environmental conditions. Optical drive manufacturers allow for adjustment of laser power at the beginning of a recording session to compensate for some of these differences. In one method, each recordable medium will have a testing region, distinct from a data-carrying region, and during an Optimum Power Calibration (OPC) "test", the testing region is written to in order to determine a better power level for writing to the media. The testing region is hereinafter referred to as the "OPC area".

Nevertheless, the OPC area of a recordable medium may not be representative of the entire medium. For example, the thickness, sensitivity, or shape of a disc can vary as distance increases from the center of the disc. Moreover, write parameters other than power can significantly affect write performance.

SUMMARY

In consideration of the above, it would be useful if it were possible to calibrate several write parameters while writing actual user data, in the data-carrying region of the disc. However, changing any write parameter outside of the OPC area is not recommended, due to the risk of writing user data that is later unreadable because of an improper selection of values for the write parameters that were used.

The foregoing situation is addressed by a two-phase procedure for calibrating optical drive laser write parameters. In the first phase, prior to writing of user data, a model for write performance as a function of write parameters is derived, based on testing in the OPC area of the recordable medium. In the second phase, calibration is performed during writing of actual user data to the data-carrying region of the recordable medium, by varying the values of the write parameters based on the predictions of write performance from the derived model. Updating of the model and recalibration in the second phase may be continuous or periodic during writing of actual user data.

Thus, in one aspect, a model is derived for write parameters of a laser in an optical drive. A parameter range for the write parameters is set based on a recordable medium. A number of test runs are recorded on the recordable medium, preferably in the OPC area, while varying the write parameters. Write performance characteristics are measured over the test runs, and a model of write performance as a function of the write parameters associated with the test runs is derived. Values for write parameters are selected for use in writing actual data on the recordable medium based on the derived model. The selected values for the write parameters in writing actual data include values that are predicted by the model to yield improved writing performance. A first section of user data is written to a data-carrying region of the recordable medium using the selected values. Write performance characteristics of the first section of user data written to the data-carrying region of the recordable medium are measured, and the model is updated by including the measurements from the data-carrying region. New values for the write parameters of the laser are selected based on the updated model, and the new values are used in writing a second section of user data to the data-carrying region of the recordable medium.

By virtue of this arrangement, it is typically possible to continuously refine various write parameters while writing actual user data to the data-carrying region of the disc, for better write performance throughout the entire disc. In particular, deriving a model of write performance as a function of write parameters provides confidence in varying the values of write parameters, since the resultant write performance can be predicted, and the possibility of selecting improper values for the write parameters is largely eliminated.

In another aspect of the invention, a model is derived for write parameters of a laser in an optical drive. There are means for setting a parameter range for the write parameters based on a recordable medium. In addition, there are means for recording a number of test runs on the recordable medium, preferably in the OPC area, while varying the write parameters, means for measuring write performance characteristics over the test runs, and means for deriving a model of write performance as a function of the write parameters associated with the test runs. There are also means for selecting values for write parameters for use in writing actual data on the recordable medium based on the derived model. The selected values for the write parameters in writing actual data include values that are predicted by the model to yield improved writing performance. Additionally, there are means for writing a first section of user data to a data-carrying region of the recordable medium using the selected values, means for measuring the write performance characteristics of the first section of user data written to the data-carrying region of the recordable medium, and means for updating the model by including the measurements from the data-carrying region. There are also means for selecting new values for the write parameters of the laser based on the updated model, and the new values are used in writing a second section of user data to the data-carrying region of the recordable medium.

In still another aspect of the invention, a computer-executable program stored on a computer-readable medium causes a computer to derive a model for write parameters of a laser in an optical drive. The program causes the computer to set a parameter range for the write parameters based on a recordable medium. The program also causes the computer to record a number of test runs on the recordable medium, preferably in the OPC area, while varying the write parameters. The program further causes the computer to measure write performance characteristics over the test runs, and to derive a model of write performance as a function of the write parameters associated with the test runs. The program additionally causes the computer to select values for write parameters for use in writing actual data on the recordable medium based on the derived model. The selected values for the write parameters in writing actual data include values that are predicted by the model to yield improved writing performance. The program causes the computer to write a first section of user data to a data-carrying region of the recordable medium using the selected values, to measure the write performance characteristics of the first section of user data written to the data-carrying region of the recordable medium, and to update the model by including the measurements from the data-carrying region. The program further causes the computer to select new values for the write parameters of the laser based on the updated model, and the new values are used in writing a second section of data to the data-carrying region of the recordable medium.

A more complete understanding of the disclosure can be obtained by reference to the following detailed description and to the attached drawings.

DETAILED DESCRIPTION

Figure 1:
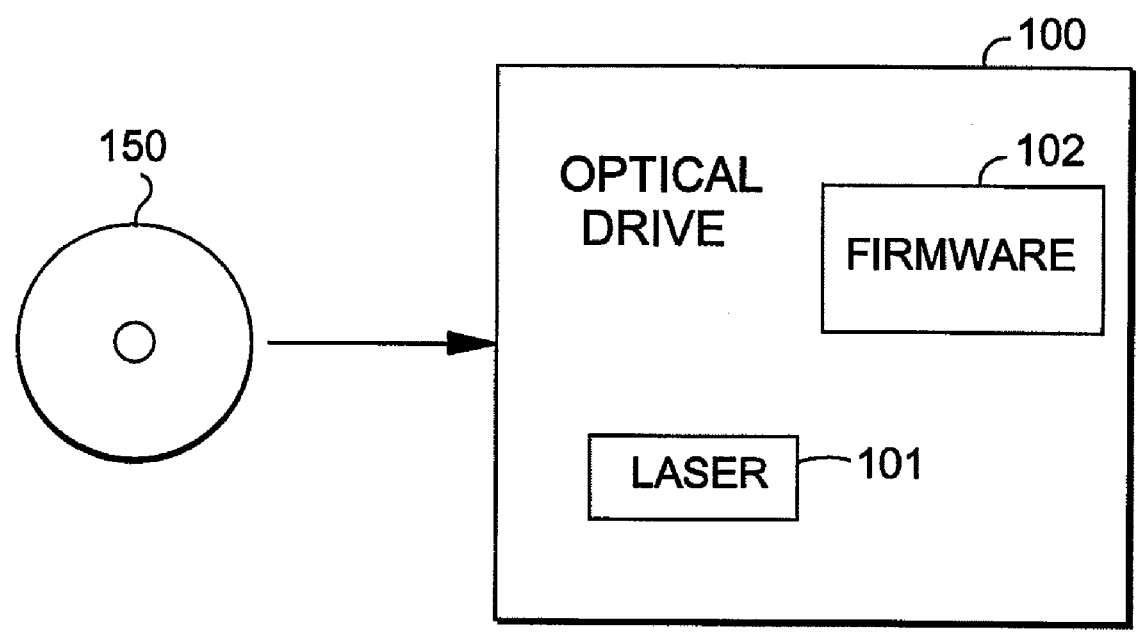
FIG. 1 illustrates an example of a disc-writing environment.

FIG. 1 depicts a simplified example embodiment of a disc-writing environment.

As shown in FIG. 1, the disc-writing environment includes optical drive 100 and disc 150. Optical drive 100 comprises laser 101 and firmware 102.

Optical drive 100 uses one or more lasers to retrieve and/or store data on optical discs—e.g., CDs and DVDs. More specifically, the laser is used to encode or "burn" data into the disc by selectively heating parts of the disc to form burned "pits" and unburned "lands". The pits and lands can then be detected in order to read data from the disc. For rewritable media, the laser is used to melt a crystalline metal alloy in the recording layer of the disc. Some common types of optical drives include CD-RW, DVD±RW, DVD-HD and Blu-ray drives.

Laser 101 is an optical laser used to write data to recordable media such as disc 150. Laser 101 can also read data from disc 150. For purposes of a more focused description, all of the various components of the laser unit are not shown, but a few components will be briefly described. For example, laser 101 includes an optical pickup unit or "pick-up head" including the semiconductor laser, a lens for guiding the laser beam, and photodiodes for detecting light reflection from disc's surface. Two or more servomechanisms may be used to keep a distance of lens to disc, to ensure a laser beam is focused on a small laser spot on a disc, and to move the head along a disc's radius.

Numerous parameters of a laser can be adjusted and calibrated according to design goals for good writing performance. Example writing parameters of a laser include the power of the laser, the laser focus depth, the tilt of the objective lens, the radial offset, and write strategy parameters such as the width distribution, the interval between pulses, peakedness, amplitude, phase, frequency, inter-pulse separation, switch speed, the length or width of the pits and lands, and user-defined parameters, among many others. Certain values for laser parameters may produce improved quality with one type or brand of recordable media, whereas another set of values for parameters may work better with another type or brand of recordable media.

Firmware 102 controls laser 101. For example, firmware 102 may identify the type of recordable media, compute performance characteristics and parameters of the laser, perform mathematical operations, and control optical drive 100 so as to calibrate or re-calibrate the writing parameters of laser 101. Of course, firmware 102 may control various other processes in optical drive 100, such as disc loading and ejection and input/output.

Disc 150 is one example of a recordable medium that can be written to by optical drive 100. Numerous embodiments of disc 150 are possible, including a recordable CD-R, DVD-R, DVD+R, BD-R or HD DVD-R disc, rewritable CD-RW, DVD-RW, DVD+RW, DVD-RAM, BD-RE, or HD DVD or Blu-Ray discs, and double-sided or double-layer versions of the above, among others.

Various manufacturers construct such recordable media, and characteristics of a disc often vary according to the manufacturer. To aid in writing to the medium, the manufacturer of disc 150 may include data on disc 150 regarding characteristics of disc 150. For example, disc 150 may include a reserved area storing address in pre-groove (ADIP) information containing tolerance information for the disc, such as the maximum level of laser power disc 150 can handle before producing unacceptable data. While ADIP information is thus useful in approximating a tolerable range of values for writing parameters, the ADIP information does not contain writing parameter values to compensate for a specific optical drive and writing environment, much less information regarding physical variations throughout the disc.

Figure 2:
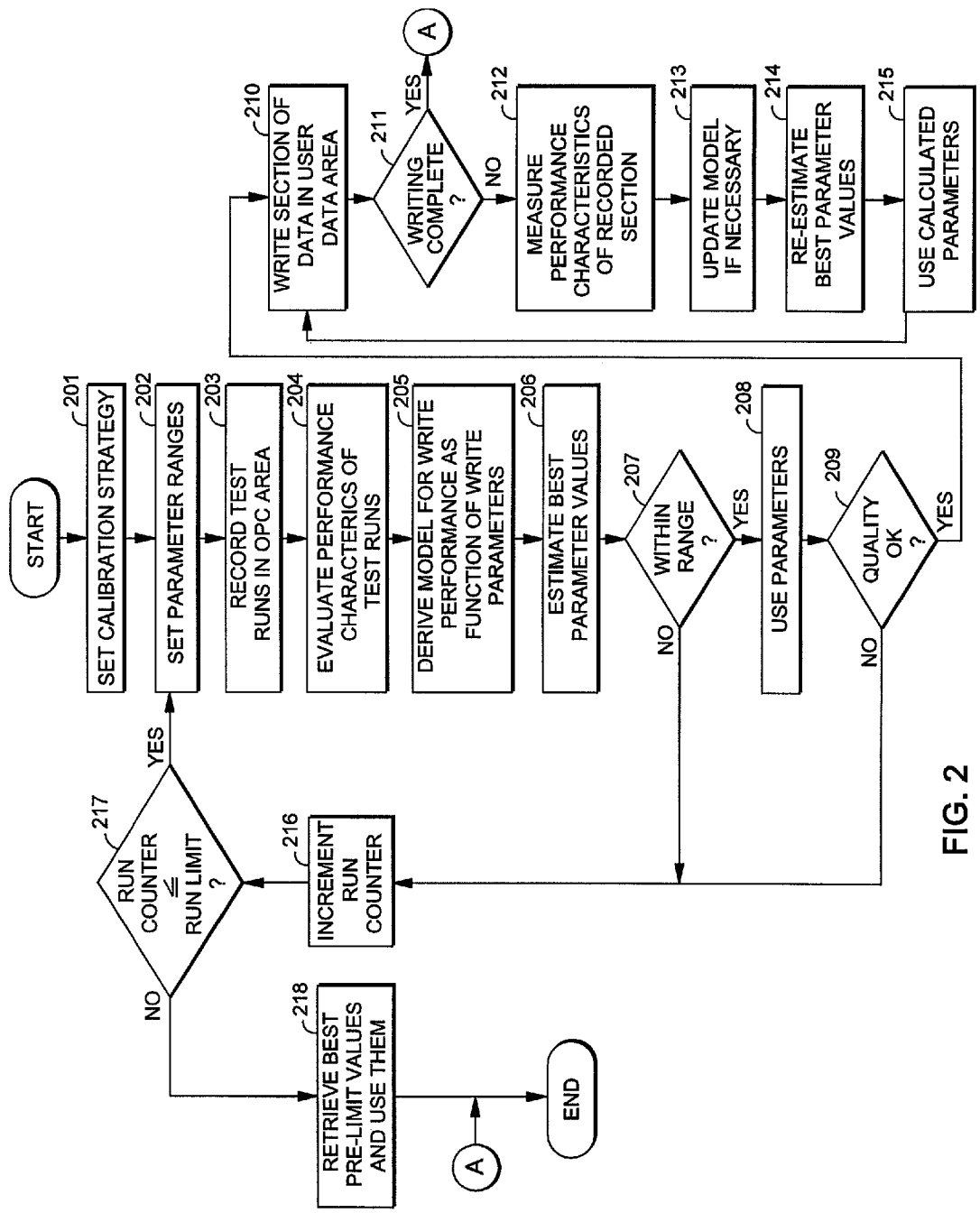
FIG. 2 illustrates an example of a process for continuously calibrating parameters of an optical drive.

Therefore, an example process for continuous calibration of laser write parameters in an optical drive will now be described with respect to FIG. 2.

In step 201, firmware 102 determines a continuous calibration strategy. In particular, firmware 102 determines a strategy for when and how often to recalibrate the write parameters throughout the write process.

In one embodiment, several recalibration strategies are possible. For example, a simple method could be to simply recalibrate after set a time or "distance" on the disk, such as after every 3 seconds or after every $3^{rd}$ track. Alternatively, the number of calibrations could be selected based on the brand of disc 150. For example, the number of calibrations could be based on the manufacturer, with a more trustworthy manufacturer's disc requiring fewer calibrations. In another method, the number of calibrations could be adjusted dynamically based on measured performance characteristics during writing. For example, firmware 102 could reduce the number of required recalibrations if there is little or no change in performance throughout disc 150, since less change in performance indicates that laser 101 is writing data consistently or uniformly throughout disc 150. The recalibration strategy could be entered by a user, downloaded from another computer, or selected based on characteristics of disc 150, among other options.

In step 202, firmware 102 sets allowable ranges for varying the laser writing parameters of laser 101. As mentioned above, different recordable media can only tolerate certain ranges of laser characteristics while still producing acceptable output. Thus, the firmware sets the range of possible values for each laser writing parameter in accordance with disc 150, so that time and energy are not wasted by testing a laser writing parameter value which falls outside an allowable range. In one example embodiment, firmware 102 controls the laser 101 to read ADIP information from the disc 150, and the ADIP information includes information concerning the range of possible values for each writing parameter. Of course, other methods of accessing this information are possible, such as downloading this information from a network or separate computer. Once the ranges for the values of each writing parameter of laser 101 have been set for disc 150, testing can begin.

Accordingly, in step 203, firmware controls laser 101 so as to record a number of test runs on disc 150 while the values of certain parameters of laser 101 are varied in accordance with Design-of-Experiment (DOE) principles. For example, the parameters can be varied according to a Taguchi method or a Box-Behnken method, among others. These initial test runs are recorded in Optimum Power Calibration (OPC) frames, so as not to take up data-carrying space on disc 150 reserved for the user's data. Since the OPC area is not used for recording user data, the write parameter values can be varied widely within the allowable ranges, for a better chance at finding optimum performance characteristics.

In one example embodiment, the number of test runs is based on the number of writing parameters that are being calibrated. More specifically, if a greater number of writing parameters are being observed and calibrated by firmware 102, a greater number of test runs might be preferred. On the other hand, attempting to calibrate too many parameters at once might lead to unacceptable computation time, use of system resources, or physical space taken up on disc 150 for conducting additional test runs. Of course, it is possible to construct optical drives that can handle more writing parameters at once.

During the recording of the test runs, (in one embodiment) the selected variations of the parameter values are produced in a random order, so as to reduce or avoid inaccurate correlations between the output performance characteristics and conditions that are not based on writing parameters. For example, simply stepping laser power levels up in a linear fashion would lead to unacceptable correlations between performance characteristics and, for example, laser temperature or time, rather than the writing parameter values of laser 101.

After the test runs, in step 204, firmware 102 evaluates the performance characteristics produced by each test run, and stores this data in a memory along with the laser writing parameter values of the test run. The writing parameters to be varied can include the laser power ("power"), the write pulse duration for 3T marks ("ti3"), the initial pulse time ("ttop"), and the width of the last 4T pulse ("tlp4"), among many others. Example measured performance characteristics include the asymmetry of the HF signal which represents the relation between the smallest and largest symbol in the signal (or a similar parameter called "Beta" representing the relation between the AC and DC level of the HF signal), the block error rate ("BLER"), the jitter, the run lengths of the pit and land for 3T marks ("3T pit" and "3T land"), and the run lengths of the pit and land for 4T marks ("4T pit" and "4T land"), although several others are possible.

Next, in step 205, firmware 102 derives a model of write performance as a function of write parameter values, based on the test runs conducted in step 203. Specifically, firmware 102 will attempt to match write performance characteristics to a set or function of write parameter values, so that for a given set of write parameter values, the write performance can be estimated. This can be accomplished by several mathematical methods including, for example, interpolation or the method of least squares.

In step 206, firmware 102 calculates an estimate of writing parameter values that will produce the best possible performance characteristics, using the mathematical model derived in step 205. Once firmware 102 estimates target values for the writing parameters, the process proceeds to step 207.

In step 207, firmware 102 determines whether the target writing parameter values estimated in step 206 are within the allowable range of writing parameter values for disc 150. Put another way, firmware 102 must verify that the estimated writing parameter values are actually usable on disc 150. For example, firmware 102 may estimate a power level of 20 mW in step 206, whereas disc 150 can only handle up to 15 mW (as indicated, for example, by the disc's ADIP information). If the estimated values fall outside the possible range of parameters, the parameter values cannot be used, and the process proceeds to step 216 to (potentially) re-record another set of test runs. On the other hand, if the estimated parameter values fall within the allowable ranges, the process proceeds to step 208.

In step 208, firmware 102 uses the writing parameter values estimated by the mathematical model. Specifically, laser 101 is configured to the target writing parameter values. Thus, subsequent writing of user data with the laser is performed according to these new writing parameter values, and should lead to similarly improved performance characteristics. As part of this step, firmware 102 writes a small amount of test data in the OPC section, to be used for verifying the performance of the writing parameter values.

In step 209, firmware 102 examines the written test data with laser 101 to determine whether the quality of the output is acceptable. If the quality of the data is unsatisfactory for any reason, then no data should be written to the disc with these parameters, and the process proceeds to step 216 to re-run the tests. On the other hand, if the quality of the confirmation track is acceptable, such as being acceptably close to performance as predicted by the model, then the laser can proceed to write data to the recordable medium according to the new writing parameter values.

Thus, a mathematical model of performance characteristics as a function of write parameter values is established by the test runs conducted in steps 202 through 209. Based on this relationship, the system can conduct continuous recalibration of laser 101 while writing user data throughout disc 150. In particular, the model is updated based on measurements of performance while writing actual user data to the data-carrying region, and new values for the writing parameters are selected based on the updated model.

In one implementation, recalibration can function to recapture initial performance characteristics to compensate for variances in disc 150, or as controlled experimentation to even further refine laser performance. For example, if the OPC test runs conducted in steps 202 through 209 produce desired values for desired performance characteristics (e.g., minimum jitter), then the further recalibrations on user data may simply compensate for any changes in disc 150 from those original performance characteristics. On the other hand, recalibration may be used to experiment and further refine write parameter values to produce even better performance characteristics. Of course, to ensure quality data, any experimentation with the write parameters would be bounded within a reasonable range according to the mathematical model established during the initial test runs.

In step 210, firmware 102 controls laser 101 to write an interval or section of user data in the data-carrying area on disc 150 according to the calibration strategy. For example, if the calibration process calls for recalibration every 15 seconds, firmware 102 would control laser 101 to write for 15 seconds. The first section of user data is written according to the writing parameter values set by writing in the OPC in steps 202 through 209. However, once writing commences, subsequent sections of user data are written according to subsequent recalibrations of the write parameter values, as discussed more fully below.

In step 211, firmware 102 determines whether the writing of user data is complete. If so, no further calibration is necessary, and the process is finished. However, if there is still user data to write, the process proceeds to step 212.

In step 212, firmware 102 measures the performance characteristics of the last recorded section of user data. Thus, firmware 102 evaluates the performance characteristics of the most recently written section of user data, and stores this data in a memory. As with the initial runs, the measured performance characteristics can include the asymmetry of the HF signal (or "beta"), the block error rate ("BLER"), the jitter, the run lengths of the pit and land for 3T marks ("3T pit" and "3T land"), and the run lengths of the pit and land for 4T marks ("4T pit" and "4T land"), although many others are possible.

In step 213, firmware 102 updates the mathematical model, if necessary. For example, the written section of user data may provide data which allows firmware 102 to further refine the mathematical model by "filling in" more points on the model.

In step 214, firmware 102 estimates new target writing parameter values based on the measured performance characteristics of the written user data, using the mathematical model established during the initial test runs (and potentially refined thereafter). For example, if the performance characteristics have suffered due to physical differences throughout disc 150, firmware 102 can use the mathematical function established in the OPC run to estimate new target writing parameter values to compensate for these changes. On the other hand, even if the characteristics of disc 150 have not changed, firmware 102 can use the relationship to estimate small changes to the values of the writing parameters to further enhance performance.

Thus, the initial tests in the OPC area establish a mathematical model between the write parameter values and performance characteristics, such that it can be assured that any variations in the parameters will still produce readable data.

Accordingly, in step 215, firmware 102 uses the target writing parameter values. Specifically, firmware 102 configures laser 101 to the new writing parameter values. Thus, subsequent writing of the next section of user data is performed according to these new writing parameter values, and should lead to improved performance characteristics.

After laser 101 is set to the new parameters in step 215, the process proceeds back to step 210 to record the next section or interval of user data. The interval or section may have changed depending on the result of the recalibration. For example, if the recalibration did not lead to any change in the writing parameters of laser 101, firmware 102 might adjust the recalibration strategy so that the next interval or section of user data is longer than the previous section. The writing and recalibration process repeats until all user data has been written.

Thus, according to the above described example embodiments, firmware 102 continuously calibrates the values of writing parameters of laser 101, using measurements of written user data to update a mathematical model, thereby to further improve writing performance throughout subsequent writing of user data.

As indicated above, if one or more characteristics of the initial set of OPC test runs is unacceptable, the process proceeds to step 216. In such a situation, it might useful to try again with one or more extra sets of test runs, in order to determine better parameters for the laser, if possible.

First, however, firmware 102 increments a run counter in step 216. The purpose of the counter is to ensure that the test run process does not continue indefinitely. In particular, the type of media simply may not correspond well with optical drive 100, and it may be impossible, unlikely, or too time-consuming to reach a test run that yields optimum output. Thus, a counter keeps track of how many cycles of test runs have been completed, and a maximum value of cycles is set as a "cut-off" for further sets of test runs.

If it is determined in step 217 that the run limit has not yet been reached, the process proceeds to step 202 to re-set the parameter ranges for testing, and the OPC calibration process repeats. If, on the other hand, the run limit has been reached, then the process continues to step 218.

In step 218, firmware 102 retrieves the test run with the best performance characteristics from the test runs conducted before the run limit was reached, and uses the corresponding write parameter values. Accordingly, even in a worst-case scenario, it is still likely that laser 101 is calibrated to writing parameter values at least as good as that if no calibration had been conducted at all.

Additionally, in accordance with various embodiments of the present invention, in order to facilitate a constant high write performance over an entire disk, write pulse properties may be periodically changed intentionally for a number of bits during writing of user data to the disk. During a brief write stop, these data may read from the disk and the data may be analyzed in order to determine the effects of varying write pulse parameters. Writing of data may be resumed. In accordance with various embodiments, this may be achieved when one knows exactly which sequence of user data may have been used for variation and analysis of the write pulse properties. This may be achieved by predestinating some user data into a buffer before encoding the data or writing to the disk to serve as test or sample data. The data may then be written to the disk and then may be read back from the disk and compared with the data stored in the buffer. Thus, one may develop and/or alter models of write performance, as previously described, based upon writing of data with varied write parameters to a disk, reading these data back from the disk and comparing the read out data with the data stored in the buffer. Thus, one always knows where test or sample data is stored for comparison purposes in order to facilitate analysis of varying of write pulse properties.

By virtue of the above-described example embodiments, it is typically possible to continuously refine a mathematical model for estimating target writing parameter values of an optical laser, for better performance throughout the entire process of writing user data.

Figure 3A:
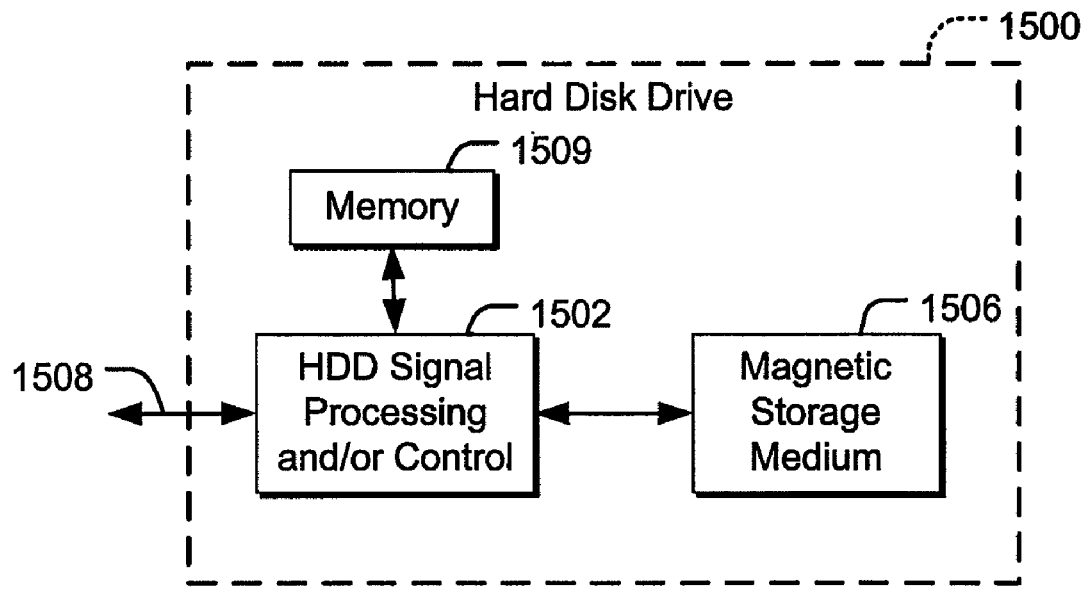
FIG. 3A is a block diagram showing an example embodiment in a hard disk drive (HDD).

Referring now to FIGS. 3A-3H, various exemplary implementations of the present invention are shown. Referring to FIG. 3A, the present invention may be embodied for calibrating parameters in a hard disk drive (HDD) 1500. The present invention may implement either or both signal processing and/or control circuits, which are generally identified in FIG. 3A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 3B:
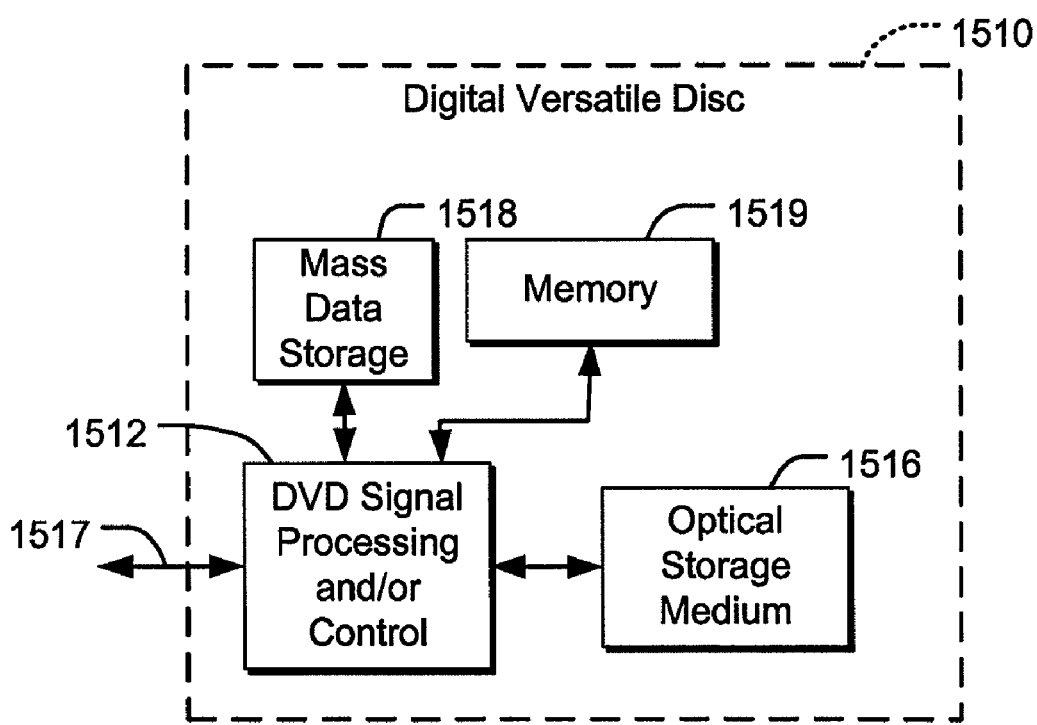
FIG. 3B is a block diagram of an example embodiment in a digital versatile disc (DVD) drive.

Referring now to FIG. 3B, the present invention may be embodied for calibrating parameters in a digital versatile disc (DVD) drive 1510. The present invention may implement either or both signal processing and/or control circuits, which are generally identified in FIG. 3B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 3A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 3C:
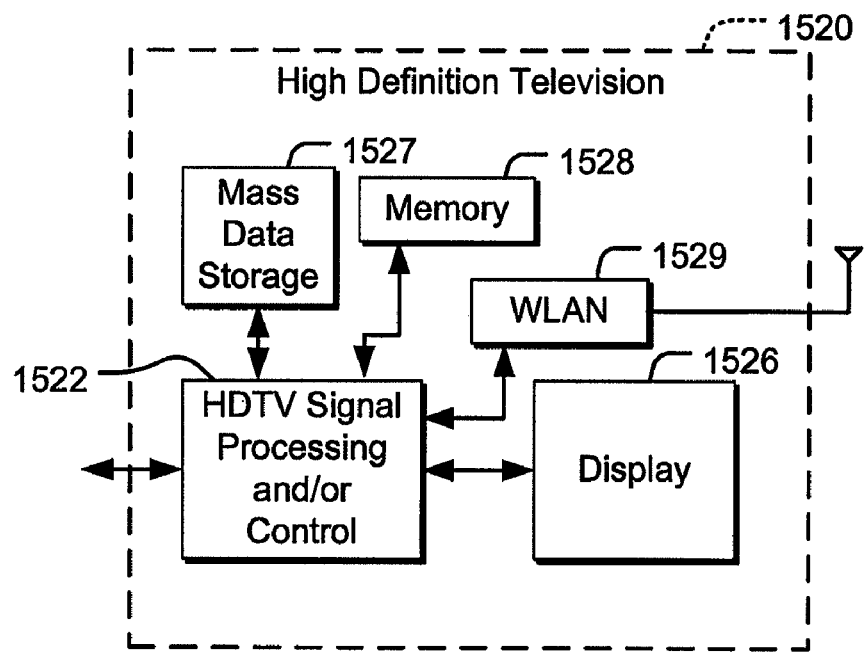
FIG. 3C is a block diagram of an example embodiment in a high definition television (HDTV).

Referring now to FIG. 3C, the present invention may be embodied for calibrating parameters in a high definition television (HDTV) 1520. The present invention may implement either or both signal processing and/or control circuits, which are generally identified in FIG. 3C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN interface 1529.

Figure 3D:
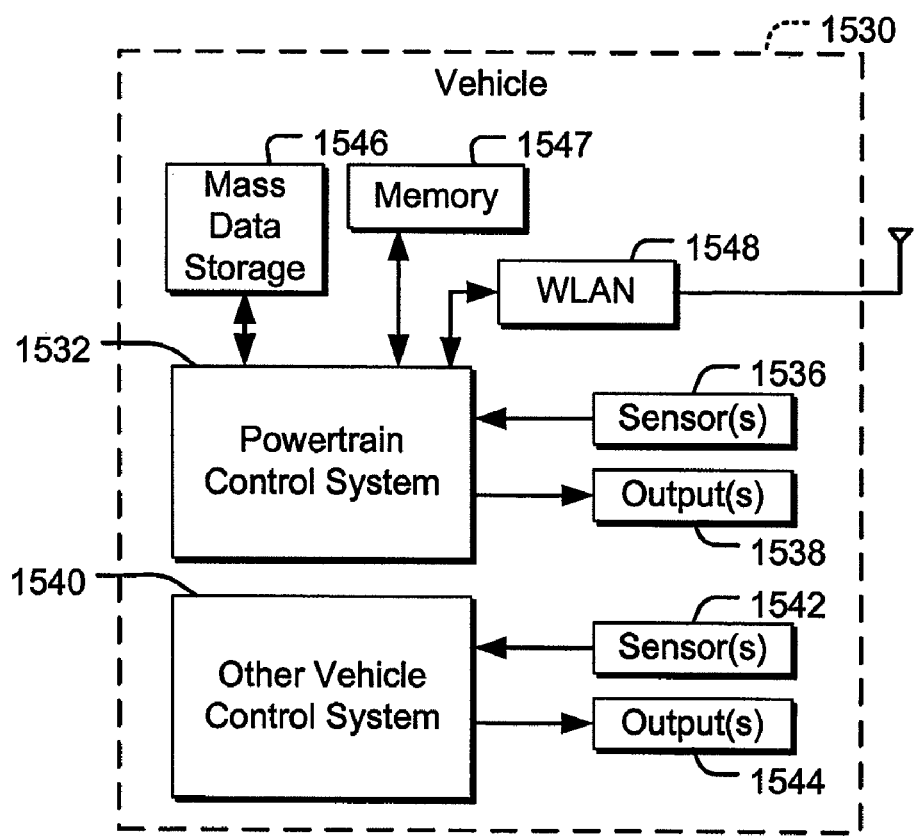
FIG. 3D is a block diagram of an example embodiment in a vehicle.

Referring now to FIG. 3D, the present invention may be embodied for calibrating parameters in a control system of a vehicle 1530, a WLAN interface and/or mass data storage of the vehicle control system. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN interface 1548. The control system 1540 may also include mass data storage, memory and/or a WLAN interface (all not shown).

Figure 3E:
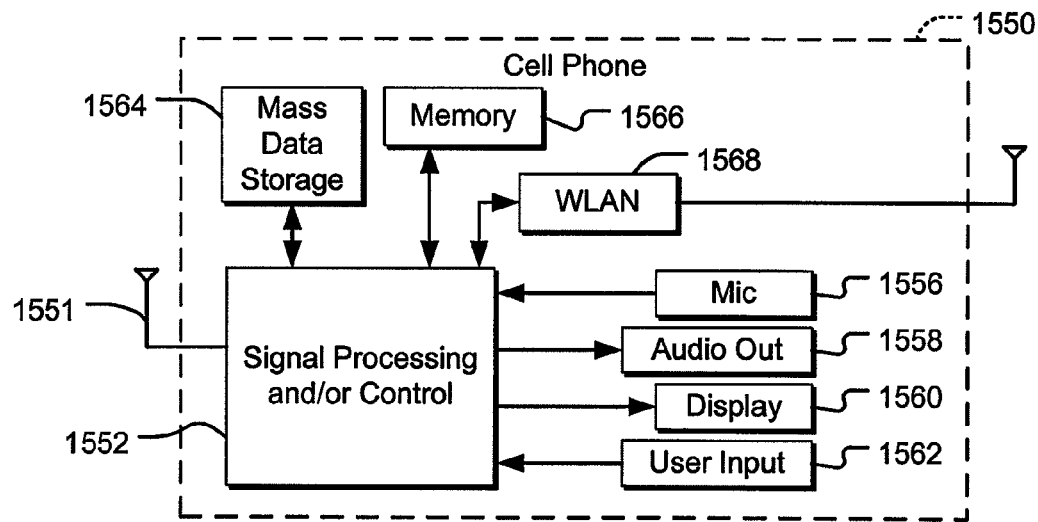
FIG. 3E is a block diagram of an example embodiment in a cellular or mobile phone.

Referring now to FIG. 3E, the present invention may be embodied for calibrating parameters in a cellular phone 1550 that may include a cellular antenna 1551. The present invention may implement either or both signal processing and/or control circuits, which are generally identified in FIG. 3E at 1552, a WLAN interface and/or mass data storage of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via a WLAN interface 1568.

Figure 3F:
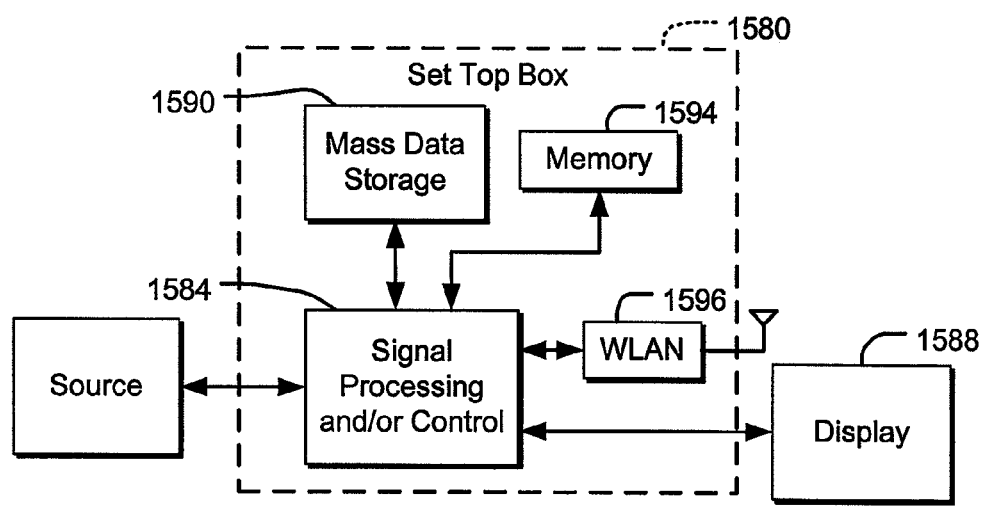
FIG. 3F is a block diagram of an example embodiment in a set-top box.

Referring now to FIG. 3F, the present invention may be embodied for calibrating parameters in a set top box 1580. The present invention may implement either or both signal processing and/or control circuits, which are generally identified in FIG. 3F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN interface 1596.

Figure 3G:
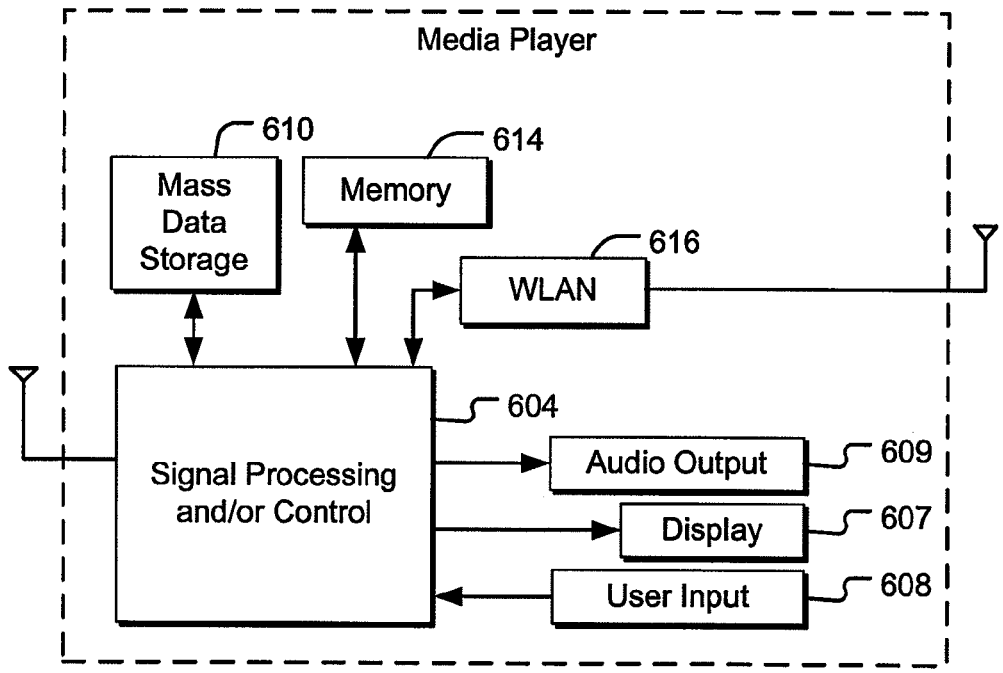
FIG. 3G is a block diagram of an example embodiment in a media player.

Referring now to FIG. 3G, the present invention may be embodied for calibrating parameters in a media player 600. The present invention may implement either or both signal processing and/or control circuits, which are generally identified in FIG. 3G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN interface 616. Still other implementations in addition to those described above are contemplated.

Figure 3H:
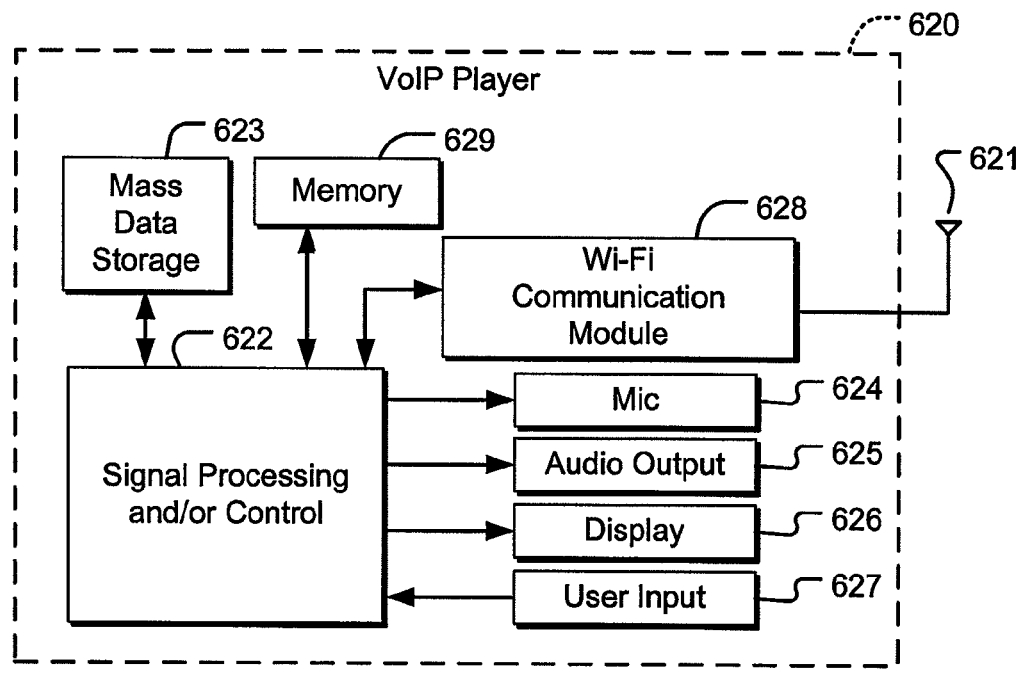
FIG. 3H is a block diagram of an example embodiment in a Voice-over Internet Protocol (VoIP) player.

Referring to FIG. 3H, the present invention may be embodied for calibrating parameters in a Voice over Internet Protocol (VoIP) phone 620 that may include an antenna 621. The present invention may implement either or both signal processing and/or control circuits, which are generally identified in FIG. 3H at 622, a wireless interface and/or mass data storage of the VoIP phone 620. In some implementations, VoIP phone 620 includes, in part, a microphone 624, an audio output 625 such as a speaker and/or audio output jack, a display monitor 626, an input device 627 such as a keypad, pointing device, voice actuation and/or other input devices, and a Wireless Fidelity (Wi-Fi) communication module 628. Signal processing and/or control circuits 622 and/or other circuits (not shown) in VoIP phone 620 may process data, perform coding and/or encryption, perform calculations, format data and/or perform other VoIP phone functions.

VoIP phone 620 may communicate with mass data storage 623 that stores data in a nonvolatile manner such as optical and/or magnetic storage devices, for example, hard disk drives and/or DVD drives. At least one HDD may have the configuration shown in FIG. 3A and/or at least one DVD drive may have the configuration shown in FIG. 3B. The HDD may be a mini HDD that includes one or more platters having a diameter that is smaller than approximately 1.8". VoIP phone 620 may be connected to memory 629, which may be a RAM, ROM, low latency nonvolatile memory such as flash memory and/or other suitable electronic data storage. VoIP phone 620 is configured to establish communications link with a VoIP network (not shown) via Wi-Fi communication module 628.

Example aspects of the disclosure have been described above with respect to particular illustrative embodiments. It is understood that the disclosure is not limited to the above-described example embodiments and that various changes and modifications may be made without departing from the scope of the disclosure. For example, one or more steps of methods discussed above may be performed concurrently or in a different order and still achieve desirable results.

What is claimed is:

1. A method for deriving a model for write parameters of a laser in an optical drive, the method comprising:

setting a parameter range for the write parameters based on a recordable medium;

recording a number of test runs on the recordable medium while varying the write parameters;

measuring write performance characteristics over the test runs;

deriving a model of write performance as a function of the write parameters associated with the test runs;

selecting values for write parameters for use in writing actual data on the recordable medium based on the derived model, wherein the selected values for the write parameters in writing actual data comprise values that are predicted by the model to yield improved writing performance;

storing, as sample data, a first section of user data in a buffer;

writing the first section of user data to a data-carrying region of the recordable medium using the selected values;

measuring write performance characteristics of the first section of user data written to the data-carrying region of the recordable medium;

updating the model by including the measurements from the data-carrying region; and selecting new values for the write parameters of the laser based on the updated model, wherein the new values are used in writing a second section of user data to the data-carrying region of the recordable medium;

wherein said measuring write performance characteristics of the first section of user data further comprises reading the first section of user data from the data-carrying region of the recordable medium, and comparing the first section of user data read from the data-carrying region of the recordable medium with the sample data in the buffer to provide measurements.

2. The method according to claim 1, wherein a length of each written section of user data is based on a manufacturer of the recordable medium.

3. The method according to claim 1, wherein a length of each written section of user data is based on a predetermined interval of time.

4. The method according to claim 1, wherein a length of each written section of user data is based on whether performance characteristics of the laser on the recordable medium have changed during writing of user data.

5. The method according to claim 4, wherein a length of each written section of user data is adjusted based on how much the performance characteristics of the laser on the recordable medium have changed during writing of user data.

6. The method according to claim 1, wherein selecting new values for the write parameter values comprises varying the write parameter values according to a Design-of-Experiments (DOE) methodology.

7. The method according to claim 6, wherein varying the write parameter values comprises using a Taguchi methodology.

8. The method according to claim 1, further comprising counting how many times the number of test runs has been recorded on the recordable medium.

9. An apparatus for calibrating write parameters in an optical drive, the apparatus comprising:

a setting unit to set a parameter range for the write parameters based on a recordable medium;

a recording unit to record a number of test runs on the recordable medium while varying the write parameters;

a first measuring unit to measure write performance characteristics over the test runs;

a deriving unit to derive a model of write performance as a function of the write parameters associated with the test runs;

a selecting unit to select values for write parameters for use in writing actual data on the recordable medium based on the derived model, wherein the selected values for the write parameters in writing actual data comprise values that are predicted by the model to yield improved writing performance;

a writing unit to (i) write a first section of user data to a data-carrying region of the recordable medium using the selected values and (ii) store, as sample data, the first section of user data in a buffer;

a second measuring unit to measure the write performance characteristics of the first section of user data written to the data-carrying region of the recordable medium by (i) reading the first section of user data from the data-carrying region of the recordable medium and (ii) comparing the first section of user data read from the data-carrying region of the recordable medium with the sample data in the buffer; and an updating unit to update the model by including the measurements from the data-carrying region, wherein the selecting unit selects new values for the write parameters of the laser based on the updated model, and wherein the new values are used in writing a second section of user data to the data-carrying region of the recordable medium.

10. The apparatus according to claim 9, wherein a length of each written section of user data is based on a manufacturer of the recordable medium.

11. The apparatus according to claim 9, wherein a length of each written section of user data is based on a predetermined interval of time.

12. The apparatus according to claim 9, wherein a length of each written section of user data is based on whether performance characteristics of the laser on the recordable medium have changed during writing of user data.

13. The apparatus according to claim 12, wherein a length of each written section of user data is adjusted based on how much the performance characteristics of the laser on the recordable medium have changed during writing of user data.

14. The apparatus according to claim 9, wherein the new values for the write parameter values are varied according to a Design-of-Experiments (DOE) methodology.

15. The apparatus according to claim 14, wherein the new values for the write parameter values are varied according to a Taguchi methodology.

16. The apparatus according to claim 9, further comprising a run counter to count how many times the number of test runs has been recorded on the recordable medium.

17. A method comprising:

providing a model of write parameters;

designating a portion of user data as sample data;

storing the sample data within a buffer;

writing, based upon at least one write parameter, the sample data to a recordable medium to provide written sample data;

reading the written sample data from the recordable medium;

performing a comparison of the written sample data read from the recordable medium with the sample data stored in the buffer; and altering the model of write parameters based upon the comparison.

18. The method of claim 17, wherein a length of the portion of user data is based upon a manufacturer of the recordable medium.

19. The method of claim 17, wherein a length of the portion of user data is based upon a predetermined interval of time.

20. The method of claim 17, wherein a length of the portion of user data is based upon whether performance characteristics of a laser writing to the recordable medium have changed during writing of other user data.

21. The method of claim 20, wherein the length is adjusted based on how much the performance characteristics of the laser have changed during writing of other user data.

22. The method of claim 17, wherein altering the model of write parameters comprises varying the write parameters according to a Design-of-Experiments (DOE) methodology.

23. The method of claim 22, wherein varying the write parameters comprises using a Taguchi methodology.

24. A method comprising the steps of:

(i) designating a portion of user data as sample data;

(ii) storing the sample data within a buffer;

(iii) writing, based upon at least one write property, the sample data to a recordable medium to provide written sample data;

(iv) reading the written sample data from the recordable medium;

(v) performing a comparison of the written sample data read from the recordable medium with the sample data stored in the buffer;

repeating the previous steps (i)-(v) a plurality of times to provide multiple comparisons; and deriving a model of write parameters based upon at least some of the multiple comparisons.

25. The method of claim 24, further comprising:

altering characteristics of the at least one write property to provide an altered at least one write property;

reading the sample data from the buffer;

writing, based upon the altered at least one write property, the sample data read from the buffer to provide additional written sample data to the recordable medium;

reading the additional written sample data from the recordable medium;

performing an additional comparison of the additional written sample data read from the recordable medium with the sample data stored in the buffer; and altering the model of write parameters based upon the additional comparison.

26. An apparatus comprising a circuit configured to:

designate a portion of user data as sample data;

store the sample data within a buffer;

control a laser to write, based upon at least one write parameter from a model of write parameters, the sample data to a recordable medium to provide written sample data;

control the laser to read the written sample data from the recordable medium;

perform a comparison of the written sample data read from the recordable medium with the sample data stored in the buffer; and alter the model of write parameters based upon the comparison.

27. The apparatus of claim 26, wherein a length of the portion of user data is based upon a manufacturer of the recordable medium.

28. The apparatus of claim 26, wherein a length of the portion of user data is based upon a predetermined interval of time.

29. The apparatus of claim 26, wherein a length of the portion of user data is based upon whether performance characteristics of the laser have changed during writing of other user data.

30. The apparatus of claim 29, wherein the length is adjusted based on how much the performance characteristics of the laser have changed during writing of other user data.

31. The apparatus of claim 26, wherein altering the model of write parameters comprises varying the write parameters according to a Design-of-Experiments (DOE) methodology.

32. The apparatus of claim 31, wherein varying the write parameters comprises using a Taguchi methodology.

33. An apparatus comprising a circuit configured to:

designate a portion of user data as sample data;

store the sample data within a buffer;

control a laser to write, based upon at least one write property, the sample data to a recordable medium to provide written sample data;

control the laser to read the written sample data from the recordable medium;

perform a comparison of the written sample data read from the recordable medium with the sample data stored in the buffer;

repeat the previous steps a plurality of times to provide multiple comparisons; and derive a model of write parameters based upon at least some of the multiple comparisons.

34. The apparatus of claim 33, wherein the circuit is further configured to:

alter characteristics of the at least one write property to provide an altered at least one write property;

read the sample data from the buffer;

control the laser to write, based upon the altered at least one write property, the sample data read from the buffer to provide additional written sample data to the recordable medium;

control the laser to read the additional written sample data from the recordable medium;

perform an additional comparison of the additional written sample data read from the recordable medium with the sample data stored in the buffer; and alter the model of write parameters based upon the additional comparison.

* * * * *